H. J. PIEPGRAS & B. M. HOLT.
SEED SEPARATOR.
APPLICATION FILED JUNE 18, 1914.
1,190,950.
Patented July 11, 1916.
2 SHEETS—SHEET 1.
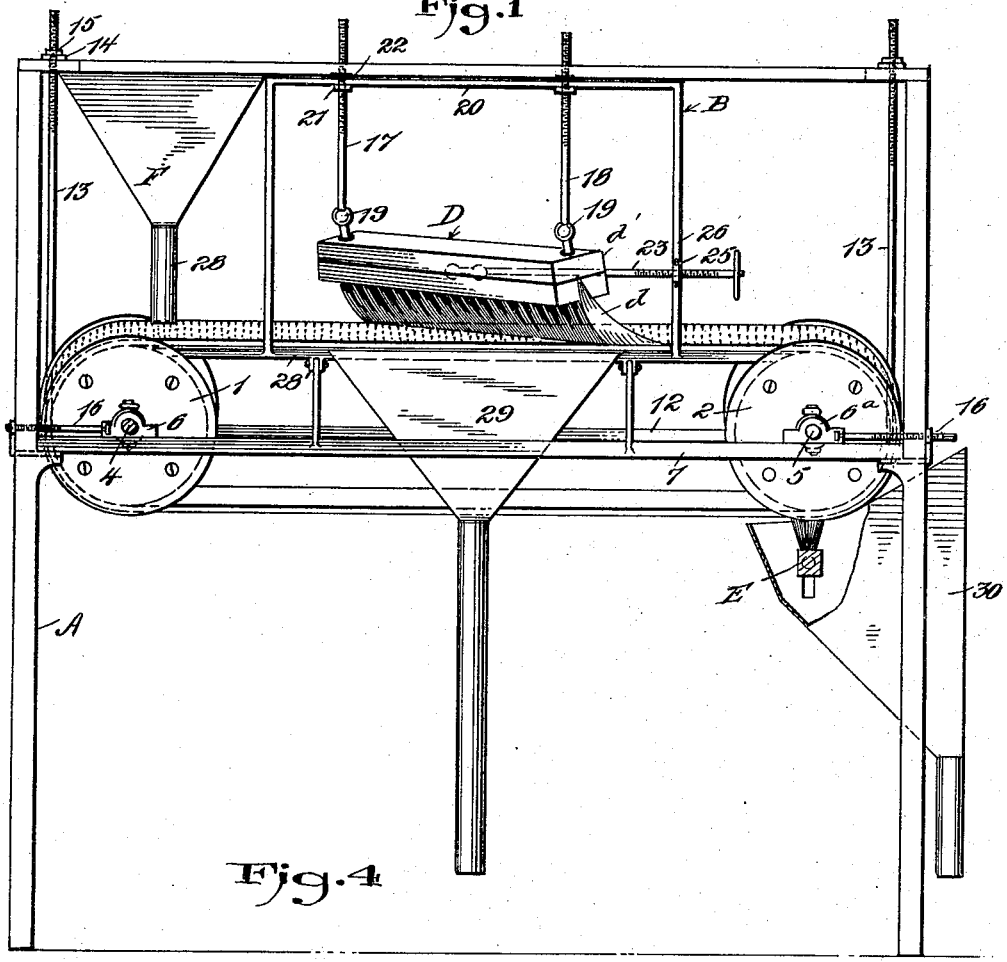
Fig. 1
Fig. 4
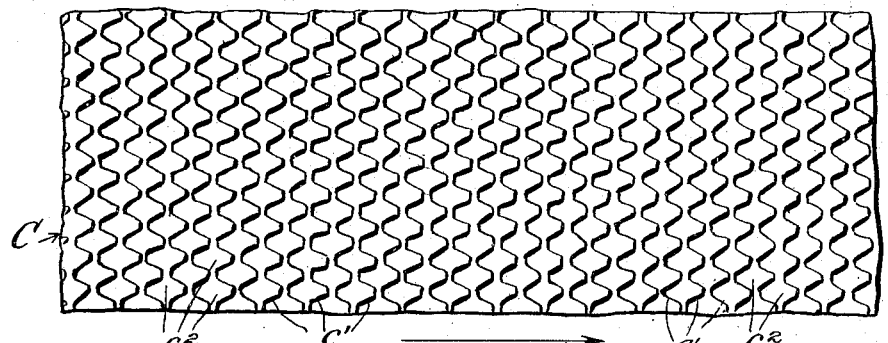
Fig. 5
WITNESSES
INVENTORS
Herman J. Piepgras
Benjamin M. Holt
BY
ATTORNEYS

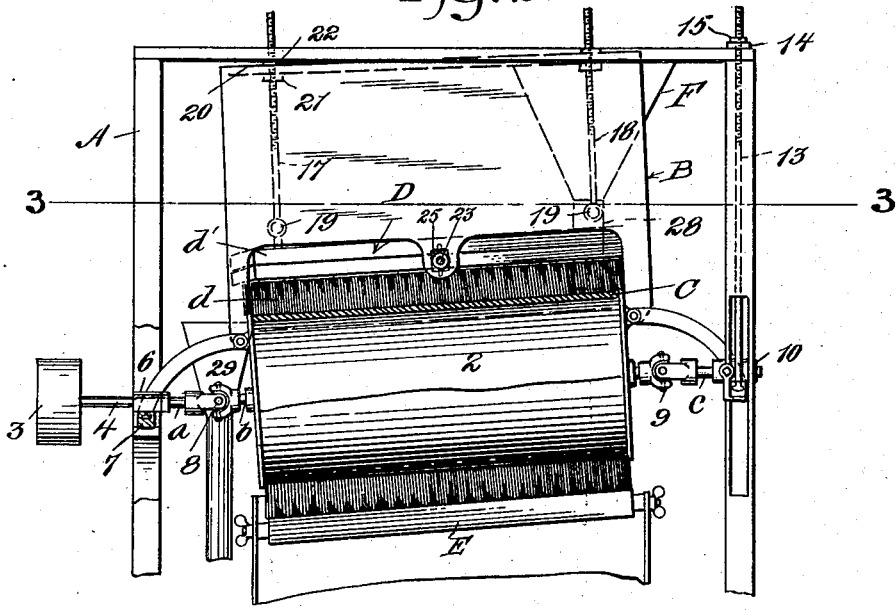
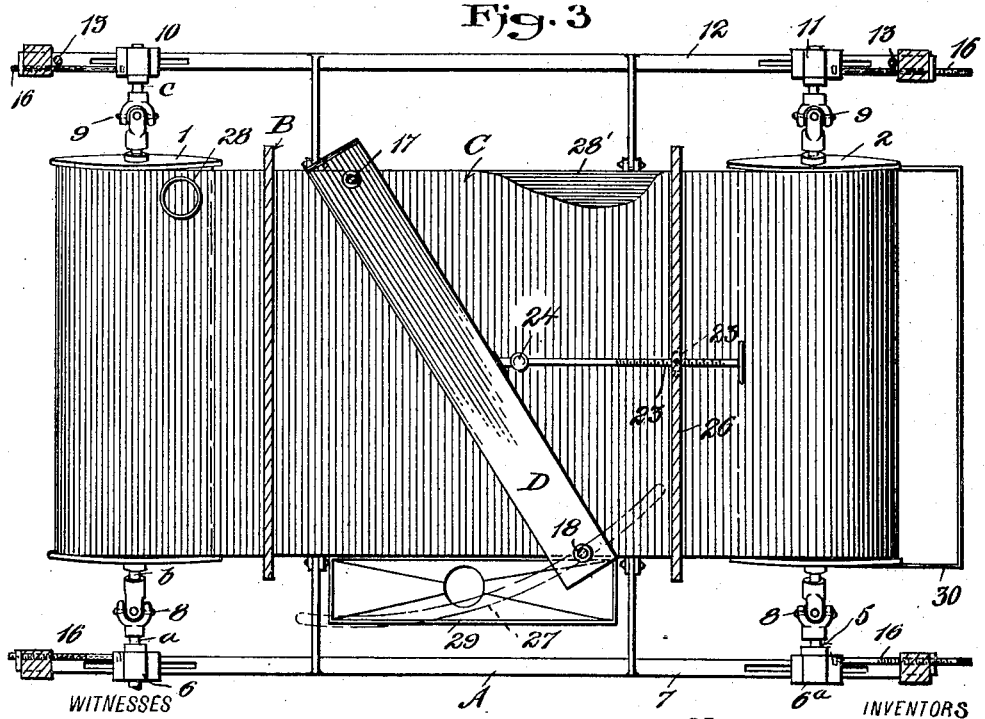

UNITED STATES PATENT OFFICE.

HERMAN J. PIEPGRAS AND BENJAMIN M. HOLT, OF CALDWELL, IDAHO.

SEED-SEPARATOR.

1,190,950.   Specification of Letters Patent.   Patented July 11, 1916.

Application filed June 18, 1914. Serial No. 845,816.

*To all whom it may concern:*

Be it known that we, HERMAN J. PIEPGRAS and BENJAMIN M. HOLT, citizens of the United States, and residents of Caldwell, in the county of Canyon and State of Idaho, have invented a new and Improved Seed-Separator, of which the following is a full, clear, and exact description.

This invention relates to seed separating machines, especially designed for separating weed seeds from grass seeds, the separation being carried out on the principle of dissimilarity of shape and surface of the seeds to be separated rather than the size of the seeds.

The invention has for its general objects to improve and simplify the construction and operation of seed separating machines so as to be thoroughly reliable and efficient in use and comparatively easy to adjust for operation on seeds of different characters.

More specifically the invention has for its object to provide a novel form of endless belt or seed carrier in combination with a novelly arranged brush whereby the grass or similar seeds are separated from the weed seeds, it being understood that the grass and similar seeds are round and smooth, while weed seeds are more or less rough or angular, which characteristics enable the weed seeds to be taken up by the belt and carried past the brush or brushes while the grass seeds are arrested by the brush or brushes and caused to roll down transversely of the belt to one edge as the belt is slightly inclined for facilitating the discharge of the grass seeds therefrom.

Still another object of the invention is to provide simple and effective means for adjusting the tension and also the inclination of the endless belt or seed carrier, and also means for adjusting the pressure of the brush against the belt, the angular relation of the length of the brush to the length of the belt and the pitch of the brush with respect to the plane of the belt, whereby efficient operation is possible on seeds having different coefficients of friction.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is an elevation of the front of the machine; Fig. 2 is a transverse section of the machine; Fig. 3 is a horizontal section; Fig. 4 is a plan view of a portion of the seed carrier or belt; and Fig. 5 is a sectional view showing the separating action of the belt and brush.

Referring to the drawing, A designates a fixed main frame of any suitable construction, and B is an adjustable frame arranged within the main frame and carrying a belt or endless seed carrier C and a coacting brush D. This belt C travels around rolls 1 and 2 at opposite ends of the machine, and one of the rolls is provided with suitable driving means, such as a pulley 3 on the shaft 4 connected with said roll so as to drive the belt in such a manner that the upper flight or run thereof will travel to the right, as shown in Fig. 1. The front ends of the shafts 4 and 5 of the rolls 1 and 2 are mounted in bearings 6 and $6^a$ respectively, carried by a horizontal bar 7 fixed on the main frame of the machine. These ends of the shafts are relatively fixed, although the rolls 1 and 2 can be adjusted in vertical planes so as to change the slope of the belt in order to place the front edge thereof at a lower level than the back edge, so that grass seeds can roll down the belt and discharge therefrom. In order to permit of this adjustment of the belt the shafts of the rolls are made in sections $a$, $b$ and $c$ united by universal joints 8 and 9, as clearly shown in Figs. 2 and 3. The rear sections $c$ of the shafts are journaled in bearings 10 and 11 which are mounted on a horizontal bar 12 capable of moving up and down. This bar is suitably guided on the main frame and can be adjusted in any suitable manner, as for instance, by suspension rods 13 which pass through bearing plates 14 at the top of the main frame and have nuts 15 whereby the rods can be moved vertically by the turning of the nuts to thereby enable the rear ends of the belt rolls to be raised or lowered. The bearings for the roll 2 are capable of horizontal adjustment by means of screws 16 for enabling the belt to be tightened.

The brush D is disposed over the upper run of the belt, and this brush comprises bristles $d$ of hair or equivalent material mounted in the back $d'$, and in operation the brush is so positioned that the bristles are disposed at an angle to the plane of the belt. The brush is supported at its ends on rods 17 and 18 which are united at the lower ends to the brush by hinge joints 19. The rods 17 and 18 are connected with the top part 20 of the adjustable frame B, and on the rods are nuts 21 and 22 which, by proper manipulation, can move the rods downwardly or upwardly so as to vary the pressure of the brush against the belt. To adjust the inclination of the brush, suitable adjusting means are employed, such as a screw 23 that is hingedly connected at 24 to the brush back $d'$ at a point below the hinges 19, so that by advancing or retracting the screw rod 23 the inclination of the brush can be changed about a horizontal axis coincident with the hinges 19. The screw 23 is threaded in a pivoted nut 25 carried in the part 26 of the frame B. In the top part 20 of the frame B there may be provided an arcuate slot 27 concentric with the rod 17, and adjustable in this slot is disposed the rod 18 whereby the longitudinal axis of the brush can be adjusted to any desired angle with respect to the length of the belt, according to the nature of the seeds to be separated. It is to be understood that the inclination of the belt, as well as the inclination of the brush bristles and the tension of the brush on the belt, will also vary according to the character of the seeds to be separated. To prevent sagging of the belt at a point under the brush a table 28' is arranged under the upper run of the belt. This table is part of the frame B and is connected with the floating bearing-carrying bar 12, and consequently when the slope of the belt is changed the brush and table will move at the same time. Adjacent the rear end of the belt and disposed under the roll 2 is a suitable brush or device E which removes from the belt the weed seeds that are carried past the brush by the belt, so that a clean surface will be presented at the receiving end of the belt. The seeds to be separated are supplied to the receiving end of the belt by a hopper F mounted on the main frame and having its spout 28 disposed over the highest portion of the belt at the receiving end. The seeds are thus discharged on this portion of the belt and are carried forward to the brush, which arrests the round or grass seeds, which, due to the slope of the belt, flow gradually to the front, lower edge and drop into a spout or equivalent means 29 arranged to receive the grass seeds. The weed seeds pass through or under the brush and discharge into a suitably-disposed spout 30 arranged at the discharge end of the machine, and it is in this spout 30 that the brush E is arranged to clean the belt from the weed seeds.

A special form of belt surface is required in order to provide for effective separation of the seeds with a coacting brush. In the present instance the seed separating surface of the belt is roughened and is preferably made of rubber. The roughening is accomplished by vulcanizing the rubber while a canvas or equivalent mold or impression element is maintained under pressure in contact with the rubber, and after the vulcanizing operation is completed the canvas or other impression element is removed, whereby there will be raised webs or ribs $c'$ which are more or less sinoidal shaped, and between adjacent ribs are grooves $c^2$ which extend transversely of the belt. In other words, the grooves constitute connected depressions or cells, and down the grooves the round seeds are free to roll as the brush sweeps back these round seeds. The angular seeds or weed seeds are caught by the ribs, projections or webs $c'$ and are carried forward under or through the brush bristles $d$, somewhat as shown in Fig. 5. The shape and size of the depressions or grooves, as well as the ribs of the belt, will vary according to the nature of the seeds to be separated.

From the foregoing description taken in connection with the accompanying drawing, the advantages of the construction and method of operation will be readily understood by those skilled in the art to which the invention appertains, and while we have described the machine which we now consider to be the best embodiment thereof, we desire to have it understood that the machine shown is merely illustrative and that such changes may be made when desired as are within the scope of the appended claims.

Having thus described our invention, we claim as new and desire to secure by Letters Patent:

1. A seed separating machine comprising a movable seed carrier having a surface formed with a plurality of cells arranged in rows transverse to the line of movement of the carrier and the adjacent cells being connected in the line of the rows, the adjacent rows being separated by a thin serpentine rib of rubber and the carrier being inclined transversely to the direction of its movement, whereby seeds drop off the lower edge of the carrier.

2. A seed separating machine comprising a traveling carrier inclined transversely to the direction of travel whereby one longitudinal edge of the carrier will be lower than the other longitudinal edge, and the upper surface of the carrier being provided with transverse rows of pockets, the rows being separated by yielding ribs and a bristle brush pressed against the carrier for causing seeds of one shape to become lodged in the pockets while arresting seeds of a different shape and causing them to roll down and off the sloping carrier at the lower longitudinal edge thereof.

3. A seed separating machine comprising an endless carrier having a rubber outer surface formed with transverse grooves separated by intermediate ribs or webs, means for supporting the carrier to slope transversely, a bristle brush bearing on the carrier and set with its length at an angle to the direction of travel of the carrier for causing certain seeds to lodge in the grooves and be carried past the brush while other seeds are arrested by the brush and caused to roll down and off the sloping carrier, the grooves being open at the bottom edge of the carrier.

4. A seed separating machine comprising an endless carrier having a rubber surface formed with rows of cells extending approximately transversely to the carrier and yielding ribs separating adjacent rows of cells, a bristle brush pressing on the said surface, means for adjusting the pressure of the brush on the carrier, means for adjusting the angle of the bristles of the brush with respect to the plane of the carrier, and means for adjusting the angle of the brush with respect to the direction of travel of the carrier.

In testimony whereof I have signed my name to this specification in the presence of two subscribing witnesses.

HERMAN J. PIEPGRAS.

Witnesses to the signature of Herman J. Piepgras:
P. V. KELLY,
ELMER BARR.

In testimony whereof I have signed my name to this specification in the presence of two subscribing witnesses.

BENJAMIN M. HOLT.

Witnesses to the signature of Benjamin M. Holt:
CHATTEN BRADWAY,
PHILIP D. ROLLHAUS.

Copies of this patent may be obtained for five cents each, by addressing the "Commissioner of Patents, Washington, D. C."